United States Patent
Vainio et al.

(10) Patent No.: US 7,315,814 B2
(45) Date of Patent: Jan. 1, 2008

(54) METHOD AND APPARATUS PROVIDING ADAPTIVE MULTI-RATE SPEECH CODING

(75) Inventors: Janne Vainio, Lempäälä (FI); Hannu Mikkola, Tampere (FI); Jani Rotola-Pukkila, Tampere (FI)

(73) Assignee: Nokia Corporation, Espoo (FI)

( * ) Notice: Subject to any disclaimer, the term of this patent is extended or adjusted under 35 U.S.C. 154(b) by 560 days.

(21) Appl. No.: 10/311,657

(22) PCT Filed: Jun. 30, 2001

(86) PCT No.: PCT/FI01/00560

§ 371 (c)(1),
(2), (4) Date: Dec. 16, 2003

(87) PCT Pub. No.: WO02/03601

PCT Pub. Date: Jan. 10, 2002

(65) Prior Publication Data

US 2004/0098251 A1    May 20, 2004

(30) Foreign Application Priority Data

Jun. 30, 2000   (FI) .................................. 20001577

(51) Int. Cl.
*G10L 19/00* (2006.01)

(52) U.S. Cl. ........................ 704/221; 704/226; 704/229
(58) Field of Classification Search ..................... None
See application file for complete search history.

(56) References Cited

U.S. PATENT DOCUMENTS

| | | | | |
|---|---|---|---|---|
| 5,541,955 A | * | 7/1996 | Jacobsmeyer | ............... 375/222 |
| 5,940,439 A | | 8/1999 | Kleider et al. | ............... 375/225 |
| 6,009,553 A | * | 12/1999 | Martinez et al. | ............ 714/784 |
| 6,163,766 A | * | 12/2000 | Kleider et al. | ............... 704/229 |
| 6,182,264 B1 | * | 1/2001 | Ott | .............................. 714/774 |
| 6,195,337 B1 | * | 2/2001 | Nystrom et al. | ............ 370/252 |

FOREIGN PATENT DOCUMENTS

WO    9948237    9/1999

OTHER PUBLICATIONS

J. Vainio, et al. "GSM EFR Based Multi-Rate Codec Family"; vol. 1, May 12-15, 1998, pp. 141-144.
Eric Yuen, et al.; "Variable Rate Speech and Channel Coding for Mobile Communication"; vol. 3, Jun. 8-10, pp. 1709-1713.
Oliver Corbun, et al., Capacityand Speech Quality aspects using Adaptive Multi-Rate (AMR); vol. 3, Sep. 8-11, 1998, pp. 1535-1539.

* cited by examiner

*Primary Examiner*—V. Paul Harper
(74) *Attorney, Agent, or Firm*—Harrington & Smith, PC

(57) ABSTRACT

A wireless telecommunications system comprises a mobile station (MS) and a network. The mobile station has a multi-rate speech encoder which produces an encoded speech signal which is transmitted to the network. The network has a multi-rate speech decoder which decodes the encoded speech signal to produce a decoded speech signal. The network also comprises a signal analyser which measures speech characteristics of the decoded speech signal to produce speech characteristics information and an up-link mode control unit which receives the speech characteristics information and produces a mode command. The mode command is transmitted by the network to the mobile station where it is used to control the speech encoding bit rate of the multi-rate speech encoder.

15 Claims, 5 Drawing Sheets

METHOD AND APPARATUS PROVIDING ADAPTIVE MULTI-RATE SPEECH CODING

FIELD OF THE INVENTION

The invention relates to adaptive multi-rate speech coding in wireless telecommunications networks.

BACKGROUND OF THE INVENTION

In transmission of a speech signal between a mobile station (MS) and a network, it is important to optimise the coding of the signal both to provide robust transmission in order to deal with variability of channel quality over the air interface and to provide high quality speech. Transmission can be made more robust in poor channel conditions by increasing the amount of error correction provided in channel coding. Speech quality can also be increased by using a higher bit rate in speech transmission. Since the gross channel bit rate is generally fixed, a balance needs to be struck between the proportions of it which are assigned to channel coding and to speech coding.

The European Telecommunications Standards Institute (ETSI) has standardised a speech service which is intended to deal with this problem. This is referred to as the Adaptive Multi Rate (AMR) speech service and, in one form, is defined in ETSI standards. In the AMR speech service the bit rates assigned to speech and channel coding are adaptively varied based on the channel quality. This is done independently in both the up-link (mobile to network) and in the down-link (network to mobile) directions. The AMR speech service has also been chosen as the mandatory speech service for third generation (3G) telecommunication systems.

FIGS. 1A and 1B show wireless telecommunications system capable of providing an AMR speech service according to the standards referred to above. A and B show how FIGS. 1A and 1B are connected to each other. The system comprises a network and a mobile station (MS). The network comprises a transcoder (TC) and a base transceiver station (BTS). A signal is transmitted from the MS to the network over an up-link radio channel and from the network to the MS over a down-link radio channel.

In the up-link direction, in the MS speech is speech encoded in a multi-rate speech encoder, channel encoded in a multi-rate channel encoder and the resulting encoded signal is then transmitted across the air interface. In the network, the encoded signal is decoded in a multi-rate channel decoder in the BTS and then speech decoded in a multi-rate speech decoder in the TC.

In the down-link direction, speech is encoded in a multi-rate speech encoder in the TC, channel encoded in a multi-rate channel encoder in the BTS and the resulting encoded signal is then transmitted across the air interface. In the MS, the encoded signal is channel decoded in a multi-rate channel decoder and then speech decoded in a multi-rate speech decoder.

Both for up-link and down-link, information about the quality of the radio link is derived by estimating the current channel state. Based on the channel state, and also taking into consideration possible constraints from network control, such as network load, encoding and decoding are adaptively varied by codec mode control. The codec mode control, in the form of a link adaptation block containing up-link and down-link mode adaptors, is located on the network side. The codec mode control selects the codec modes to be applied.

In this sense the term "codec" is referring to corresponding encoder/decoder pairs on opposite sides of the air interface. Therefore, in up-link, the codec is the multi-rate speech encoder and multi-rate channel encoder in the MS and the multi-rate channel decoder and multi-rate speech decoder in the network. In down-link, the codec is the multi-rate speech encoder and the multi-rate channel encoder in the network and the multi-rate channel decoder and multi-rate speech decoder in the in the MS.

The channel mode which is used (TCH/AFS (adaptive full rate traffic channel for speech) or TCH/AHS (adaptive half rate traffic channel for speech) is controlled by the network. Up-link and down-link always have the same channel mode.

A quality indicator is derived at the side which receives the transmitted encoded signal. The quality indicator is derived by a quality measurement unit.

For up-link adaptation, the quality indicator from an up-link quality measurement unit is directly fed into an up-link mode control unit located in the network. This mode control unit quantises the quality information according to certain threshold values and generates, taking into consideration possible constraints from network control, a Mode Command $MC_u$ indicating the codec mode to be used in the up-link path (in the up-link direction). The Mode Command is then transmitted in-band across the air interface to the MS and it is provided to the multi-rate speech encoder in the MS. The bit rate of speech encoding is changed in response to this command. The multi-rate speech encoder provides a Mode Indicator $MI_u$ to the multi-rate channel encoder in the MS. The bit rate of channel encoding is changed in response to this indication. The bit rate changes to the multi-rate speech encoder and to the multi-rate channel encoder are linked so that, in total, they equal the up-link channel gross bit rate. The Mode Indicator is then transmitted in-band across the air interface to the network and it is provided to the multi-rate channel decoder in the network. The bit rate of the channel decoder is changed in response to this Mode Indicator. The multi-rate channel decoder provides the Mode Indicator to the multi-rate speech decoder in the network (particularly in the transcoder of the network). The bit rate of the speech decoder is changed in response to the Mode Indicator. The bit rate changes to the multi-rate channel decoder and to the multi-rate speech decoder are adjusted so that they match the bit rates of the speech and channel encoders in the MS. Following these changes, incoming speech at the mobile is encoded using a codec mode which is suitable for the state of the up-link channel.

For down-link adaptation, the quality indicator from a down-link quality measurement unit is used to generate a Mode Request $MR_d$ in a down-link Mode Request generator in a link adaptation block located in the MS. The down-link Mode Request generator generates the Mode Request by comparing the down-link quality indicator with certain thresholds. The Mode Request indicates the preferred codec mode for the down-link path (in the down-link direction). The Mode Request is transmitted in-band across the air interface to the network where it is fed into a down-link mode control unit. This mode control unit generally grants the requested mode. The Mode Request may be overridden depending on possible constraints from network control. The Mode Request is then applied so that an incoming speech signal in the network is encoded in a way similar to that described above for the up-link channel.

Both for up-link and down-link, information about the presently applied codec mode (mode indication) is transmitted in-band. The Mode Indicator is channel coded using a block code which is separate from speech data. In the receiving end, this code is first decoded in the channel decoder to determine the right decoding mode for speech data. At the multi-rate channel decoder, the Mode Indicator is decoded and applied for channel decoding and speech decoding.

The thresholds which are used to compare against measured channel quality estimates and to decide when to change encoding modes are sent to the MS by the BTS. In total, there are 8 codec modes and a set of 4 codec modes are selected from these. Only one combination (codec set) of 4 particular codec modes can be used in a given direction at a given time. The codec modes differ by the proportions of the channel gross bit rate allocated between speech coding and channel coding (more robust transmission has lower bit-rate speech coding and more bits allocated to channel coding in order to deal with a larger amount of channel errors). Each codec set comprises a set of thresholds. The thresholds represent the optimum switching points between sequential speech codec modes. They are set to apply when the mode with the higher speech coding bit rate suffers from channel errors so much that the subjective quality drops to the level of the speech codec with the lower bit rate in the same channel conditions (fewer channel errors in the lower mode because of more channel coding). Information enabling the codec modes to be set is sent by the BTS to the MS at the beginning of communication and from time to time thereafter. For example, the set of 4 codec modes may be changed on hand-over. This may be in response to hand-over to a BTS that does not support the codec modes used previously.

The GSM AMR speech system operates on the existing GSM full-rate and half-rate speech traffic channels where the gross bit rates are fixed.

The codec mode in up-link may be different from the one used in down-link, while the channel mode, whether half-rate or full-rate, must be the same.

In the GSM AMR speech service, control is centralised in the network and the MS is not allowed to make autonomous decisions about the codec mode in the up-link direction. However, the network is able to determine the down-link codec mode. In doing this, the network may use the Mode Request or may use other information. The MS must be capable of operating in all possible codec modes, that is encoding and decoding for all 8 codec modes has to be implemented in the MS. The network, on the other hand, does not have to provide all possible modes because the BTS sets the mode-set (a maximum of 4 modes) for the MS and there is no mandatory requirement for it to be capable of encoding and decoding in every mode.

Other forms of codec adaptation exist. One form, referred to as source-controlled codec adaptation, is based on characteristics of the input signal. In this case, the bit rate and the parameters describing the speech signal are selected by the speech encoder. This may depend on whether the input signal is voiced/unvoiced and/or on the level of background noise. There exist well-known methods to adapt codec operation according to these parameters. A simple method is to measure the energy of the speech signal during speech pauses before it enters the speech encoder and to use the measurement obtained to select a higher or a lower bit rate. If the power is higher, higher bit rate encoding could be chosen and this would suggest a higher level of background noise.

An example of a system that uses source-controlled adaptation is the IS-95 CDMA mobile telecommunications system. In this system, control is not centralised and the mobile station and the network can each change the bit rate of the speech and channel encoders autonomously according to the speech signal which is input at the respective part of the system. The system does not have channel quality-controlled adaptation.

The reason for providing source-controlled codec adaptation is that coded speech quality degrades as a function of the bit rate, and the degradation is more distinct in the presence of the background noise. Therefore, the optimal switching point between different codec modes is different depending of the presence of background noise. However, in systems having centralised control for adaptation, where a mobile station receives and must obey instructions to change its speech encoding bit rate from a mode control unit in the network, implementation of a mobile station controlled source-controlled codec adaptation, such as that used in IS-95, is not possible.

The current implementation of the GSM AMR speech service is an adaptive system controlled by channel quality measurement. There is no source-controlled adaptation.

BRIEF SUMMARY OF THE INVENTION

According to a first aspect of the invention there is provided a method of controlling adaptive multi-rate speech coding in a wireless telecommunications system comprising a mobile station and a network, the method comprising the steps of:

measuring speech characteristics of a decoded signal produced by a multi-rate decoder located in the network;

forming a mode command on the basis of the speech characteristics;

transmitting the mode command from the network to the mobile station; and using the mode command to control the speech encoding bit rate of a multi-rate speech encoder located in the mobile station.

Preferably the method includes the step of producing a channel quality measurement. Most preferably a combination of the channel quality measurement and the speech characteristics is used to produce the mode command. If such a combination is used and it is desired to use the speech characteristics only, the weight of the channel quality measurement component may be set to zero.

Preferably the signal is a speech decoded signal. Alternatively the signal comprises speech parameters from a channel decoded signal. The signal may comprise both speech parameters and decoded speech. Preferably the quality measurement of the signal is based on one or both of speech parameters and decoded speech.

Preferably the signal is output by a multi-rate channel decoder. The signal may be output by a multi-rate speech decoder. The signal may be output by both a multi-rate channel decoder and a multi-rate speech decoder.

Preferably the mode command is formed by providing the speech characteristics measurement of the signal to a mode control unit. The mode control unit may then produce the mode command.

Advantageously, the invention may provide a source-controlled adaptation method in which the network instructs the mobile station to alter its speech encoding bit rate in changing channel conditions. This may be due to changing carrier-to-interference ratio (C/I) conditions or bit error rate (BER).

Preferably the mobile station is not permitted to autonomously change its codec mode without receiving the mode command from centralised network control.

Preferably the mode command is used to control the channel encoding bit rate of a multi-rate channel encoder in the mobile station. Preferably a mode indication derived from the mode command is used to control the channel decoding bit rate of a multi-rate channel decoder in the network. Preferably the mode indication is used to control the speech decoding bit rate of the multi-rate speech decoder located in the network.

Preferably the method is used to control encoding and decoding in an up-link channel.

Preferably both source-controlled and channel quality-controlled adaptation of encoding and decoding bit rates are performed.

Preferably a channel quality measurement is made of a channel between the mobile station and the network. Both up-link and down-link channel quality may be measured. Up-link channel quality measurement may be made in the network. Down-link channel quality measurement may be made in the mobile station. Preferably the up-link channel quality measurement is combined with the speech characteristics measurement of the signal to produce the mode command. The speech characteristics measurement of the signal may be used to modify thresholds associated with transitions between encoding bit rates.

Preferably the method is used to control encoding and decoding in the down-link channel. Preferably the down-link channel quality measurement is used in the mobile station to generate a mode request. Preferably the mode request is transmitted to the network and the network chooses whether to grant it.

Preferably a measurement is made of speech characteristics of an input signal to a multi-rate speech encoder located in the network. The mode request may be modified by the measurement of speech characteristics of the input signal to produce a down-link mode command. This modification may occur in the network. The network may take other factors into account in producing the mode command. Preferably the mode command is used to control the speech encoding bit rate of the multi-rate speech encoder located in the network.

Alternatively, the measurement of speech characteristics of an input signal is used to modify thresholds associated with transitions between encoding bit rates. Modified thresholds may be transmitted from the network to the mobile station using existing signalling methods. Layer 3 signalling may be used. This applies particularly if the invention is applied to a GSM system. Subsequent to this, a mode request may be transmitted to the network.

These embodiments enable source-controlled adaptation to be performed in conjunction with the channel quality-controlled adaptation using existing signalling.

Preferably a down-link mode indication obtained from the mode command is used to control the channel encoding bit rate of a channel encoder in the network. Preferably the down-link mode inidcation is used to control the channel decoding bit rate of a channel decoder in the mobile station. Preferably the down-link mode indication is used to control the speech decoding bit rate of a speech decoder in the mobile station.

According to a second aspect of the invention there is provided a wireless telecommunications system comprising a mobile station having a multi-rate speech encoder and a network comprising a multi-rate decoder, a signal analyser which measures speech characteristics of a decoded signal produced by the multi-rate decoder to produce speech characteristics information and an up-link mode control unit which produces a mode command, the mode command being used to control the speech encoding bit rate of the multi-rate speech encoder in the mobile station.

Preferably the multi-rate decoder is a multi-rate speech decoder. Alternatively it is a multi-rate channel decoder.

Preferably the system comprises a plurality of mobile stations.

According to a third aspect of the invention there is provided a network for controlling speech coding of a multi-rate speech encoder in a mobile station, the network comprising a multi-rate decoder, a signal analyser which measures speech characteristics of a decoded signal produced by the multi-rate decoder to produce speech characteristics information and an up-link mode control unit which produces a mode command, the mode command being used to control the speech encoding bit rate of a multi-rate speech encoder.

Preferably the multi-rate decoder is a multi-rate speech decoder. Alternatively it is a multi-rate channel decoder.

Preferably, the signal analyser measures speech characteristics of the decoded signal on the decoded signal being output by the multi-rate decoder.

An advantage of the invention is that it can be used with mobile stations which do not, themselves, control source-controlled adaptation. Therefore, it is possible to introduce this feature in the network of a pre-existing wireless telecommunications system with only minor modifications. In this case, no changes to the mobile stations are necessary.

According to a fourth aspect of the invention there is provided a method of controlling adaptive multi-rate speech coding in a wireless telecommunications system comprising a mobile station and a network, the method comprising the steps of:

measuring channel quality of a link from the network to the mobile station;

measuring speech characteristics of a signal which is to be transmitted from the network to the mobile station;

forming a mode command on the basis of the channel quality and the speech characteristics;

using the mode command to control the speech encoding bit rate of a multi-rate speech encoder located in the network.

According to a fifth aspect of the invention there is provided a method of controlling adaptive multi-rate speech coding in a wireless telecommunications system comprising a mobile station and a network, the method comprising the steps of:

measuring channel quality of a link from the network to the mobile station;

measuring speech characteristics of a signal which is to be transmitted from the network to the mobile station;

using the speech characteristics to up-date thresholds which are used to generate a mode request;

forming a mode command on the basis of the channel quality and the thresholds;

using the mode command to control the speech encoding bit rate of a multi-rate speech encoder located in the network.

According to a sixth aspect of the invention there is provided a method of controlling adaptive multi-rate speech coding in a mobile station communicating with a network, the method comprising the steps of:

measuring channel quality of a link from the network to the mobile station;

receiving up-dated thresholds which are used to generate a mode request the updated thresholds having been up-dated in accordance with speech characteristics of a signal which is to be transmitted from the network to the mobile station;

forming a mode request on the basis of the channel quality and the thresholds;

sending the mode request to the network for the network to control the speech encoding bit rate of a multi-rate speech encoder located in the network.

An advantage of this aspect is that it is not necessary to modify a mode command. The mode command may be formed as the result of up-dated thresholds. The invention allows the use of accurate unquantised channel quality measurements available in the mobile station. If a mode request in the network is over-ridden, since there are generally only a few levels of channel quality available when using the mode request (which has been sent by the mobile station) the accuracy of the mode command is compromised. However, the original unquantised channel quality in the mobile station can have many levels (64 to 256 or even more) and so a more accurate mode command is provided.

Other aspects of the invention relate to networks and wireless telecommunications systems having functional units to carry out the method steps of the fourth and fifth aspects of the invention.

BRIEF DESCRIPTION OF THE DRAWINGS:

Embodiments of the invention will now be described by way of example only with reference to the accompanying drawings in which.

DETAILED DESCRIPTION OF THE INVENTION:

In the following, the invention is described in relation to Figures which separately show blocks used in up-link and down-link. This is in order to present the invention clearly.

Figure 1A:
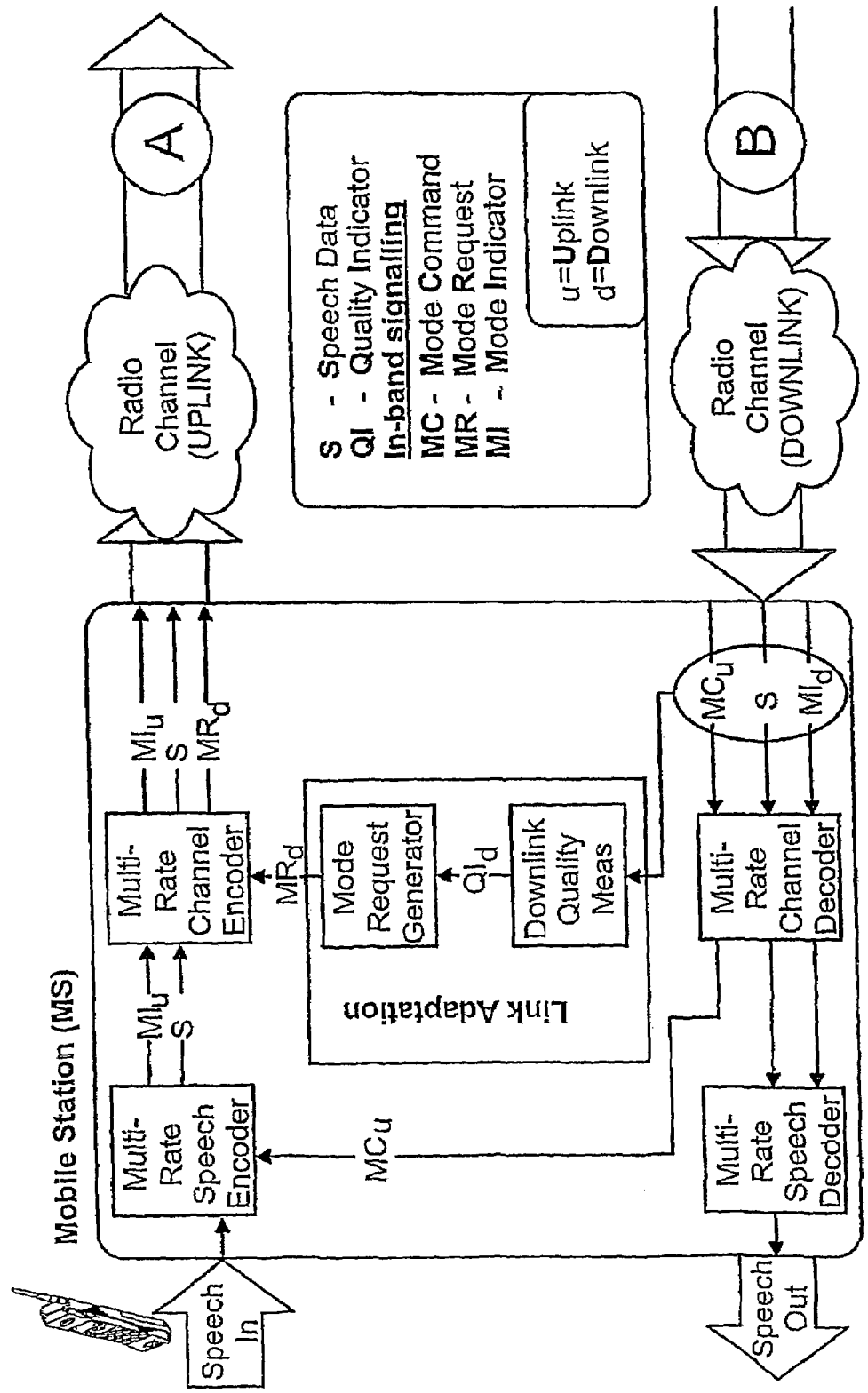
FIG. 1 shows a GSM system having the AMR speech service.
Figure 1B:
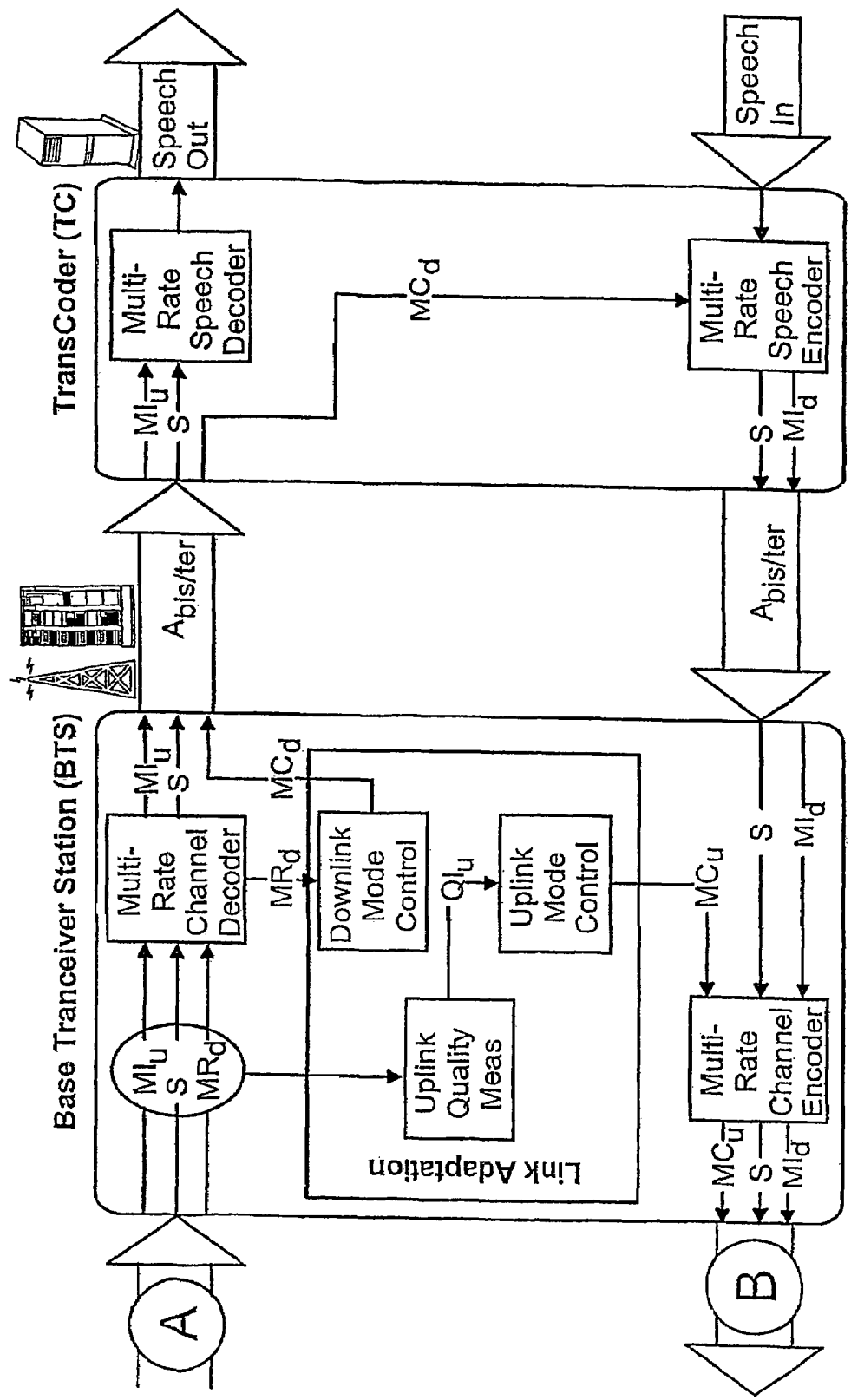
Figure 2:
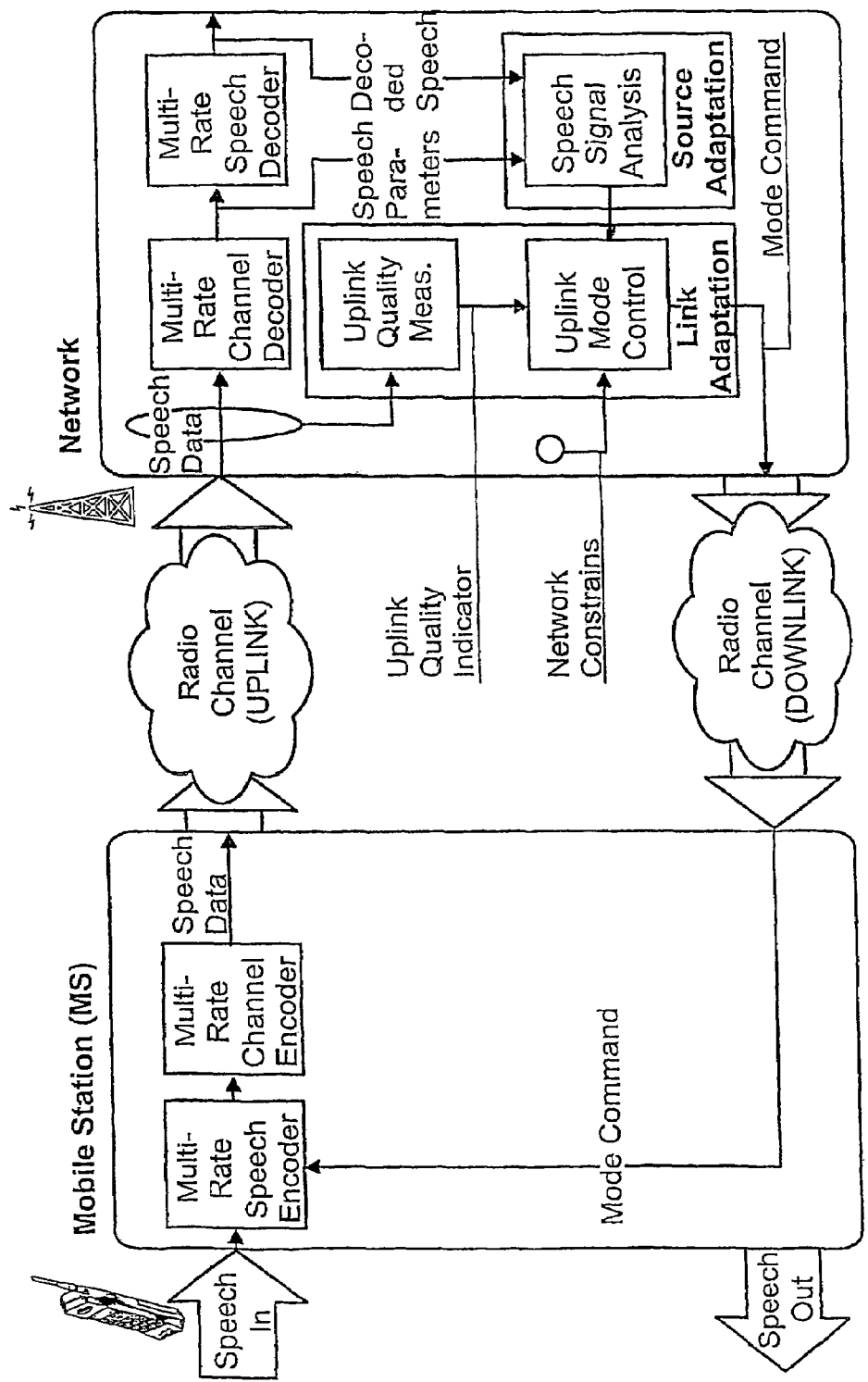
FIG. 2 shows an implementation of the invention in an up-link path of a GSM system.

FIG. 2 shows a wireless telecommunications system capable of providing an AMR speech service. The system comprises a network and a mobile station (MS). Certain features of the network, such as a transcoder (TC) and a base transceiver station (BTS), are not shown in this Figure. However, it is to be understood that they are present in a system according to the invention. Those parts of the system involved in up-link AMR control will now be described.

In an up-link direction, in the MS an input signal is speech encoded in a multi-rate speech encoder, channel encoded in a multi-rate channel encoder and then transmitted across the air interface. In the network the channel encoded signal is decoded in a multi-rate channel decoder and then speech decoded in a multi-rate speech decoder to provide a decoded speech signal.

In the network, channel quality information is derived by estimating the current state of the up-link channel. The quality information is processed in an up-link quality measurement unit to produce a quality indicator. The quality indicator from the up-link quality measurement unit is fed into an up-link mode control unit located in the network.

At the output of the multi-rate channel decoder, speech parameters are taken and fed into a source adaptation block where speech signal analysis is carried out to determine speech characteristics. In addition, or alternatively, at the output of the multi-rate speech decoder, a current frame of decoded speech signal (synthesised speech signal) is taken and is also fed into the source adaptation block where speech signal analysis is carried out to determine speech characteristics. For dealing with an input from each source (both the channel decoder and the speech decoder), determining the speech characteristics can include classifying the signal as voiced or unvoiced and/or estimating the background noise level of the signal. In the decoded speech signal, a voice activity detector (VAD) can be used for determining the level of the background noise during speech pauses. For the channel decoded speech parameters an LTP (long term prediction) lag parameter and LTP gain values can be used to classify the signal as voiced or unvoiced. For example, if the LTP lag parameter is relatively stable and if the LTP gain value is close to unity, it usually indicates a highly voiced signal and if the LTP lag parameter is changing rapidly and LTP gain value is small it usually indicates an unvoiced signal. In one embodiment, these measurements are combined and LTP lag parameters are only calculated during speech (when the VAD indicates that this is so) so that speech pauses are ignored. Also the spectral parameters in the form of LPC (linear predictive coding coefficients) can be used to estimate whether the signal is voiced or unvoiced.

If only one of the speech parameters and the decoded speech is used to obtain the speech characteristics, it is preferred that it be the decoded speech.

The speech characteristics are sent by the source adaption block to the up-link mode control unit.

Speech signal characterisation of the decoded speech occurs in the source adaptation block continuously.

The up-link mode control unit receives a third input comprising network constraints such as load in the network. Alternatively, if the mode cannot be changed because of some network constraint then transmission power in the up-link direction is increased rather than entering into a more channel-error robust mode. The up-link mode control unit takes the results of the speech signal analysis together with the channel quality from the up-link quality estimator and then uses thresholds to make an optimised decision about which mode to use. This decision takes into consideration possible constraints from network control, such as network load. The up-link mode control unit produces a Mode Command $MC_u$ indicating the codec mode to be used in the up-link path. The Mode Command is then transmitted in-band across the air interface to the MS and it is provided to the multi-rate speech encoder. In other embodiments, the mode indicator may be transmitted in another channel, for example in a signalling channel. The bit rate of speech encoding in the MS is changed in response to this command. The multi-rate speech encoder provides a Mode Indication MI to the multi-rate channel encoder of the MS. The bit rate of channel encoding is changed in response to this indication. The bit rate changes to the multi-rate speech encoder and to the multi-rate channel encoder are linked so that the up-link channel gross bit rate is maintained. The mode indicator is then transmitted in-band across the air interface to the network and it is provided to the multi-rate channel decoder in the network. The bit rate of the channel decoding is changed in response to this indication. The multi-rate channel decoder provides the Mode Indication to the multi-rate speech decoder. The bit rate of the speech decoder is changed in response to this indication. The bit rate changes to the multi-rate channel decoder and to the multi-rate speech decoder match the operations performed in the encoder to enable correct decoding of the encoded signal. Following these changes, the speech signal to be transmitted by the MS is encoded in a suitable codec mode taking into consideration the speech signal and the channel quality.

An example will now be given of an optimised decision which takes account of the channel quality, load of the network and the analysis of the actual speech signal in the up-link in the network. In this example, there is a full rate channel and three modes 1, 2 and 3. Mode 1 is the most robust mode with a large amount of channel coding and mode 3 is the least robust mode with a small amount of channel coding but the highest absolute quality in error free situations. Initially, in up-link mode 3 is used and the channel quality is good. In this example it is assumed that there is a very high background noise level in the received signal, which makes it more difficult to encode the signal with the very low-bit-rate speech codec (such as mode 1 in this example) and it is also assumed that suddenly the channel quality degrades significantly. If the load of the network is low, the optimised decision in this situation will be made as follows: 1) The load will not affect the decision in this case, 2) When looking only at the channel quality threshold values of the different modes it would be the most optimal to change from mode 3 to the lowest mode 1. However, because of the very high background noise level, the system will instead send a mode command to the mobile station commanding it to use mode 2 in order to preserve the quality during the high background noise at the expense of the error rate. The mode control unit is intelligent in that it is able to combine information from various sources in generating the mode command.

In a system having centralised control such as the GSM AMR speech service, the MS obeys the Mode Command and, as far as operation of the MS is concerned, the fact that the speech signal characteristics have been used when selecting the most appropriate mode is irrelevant. Therefore, in a system according to the invention, no changes are needed in the MS for the invention to be implemented.

Figure 3:
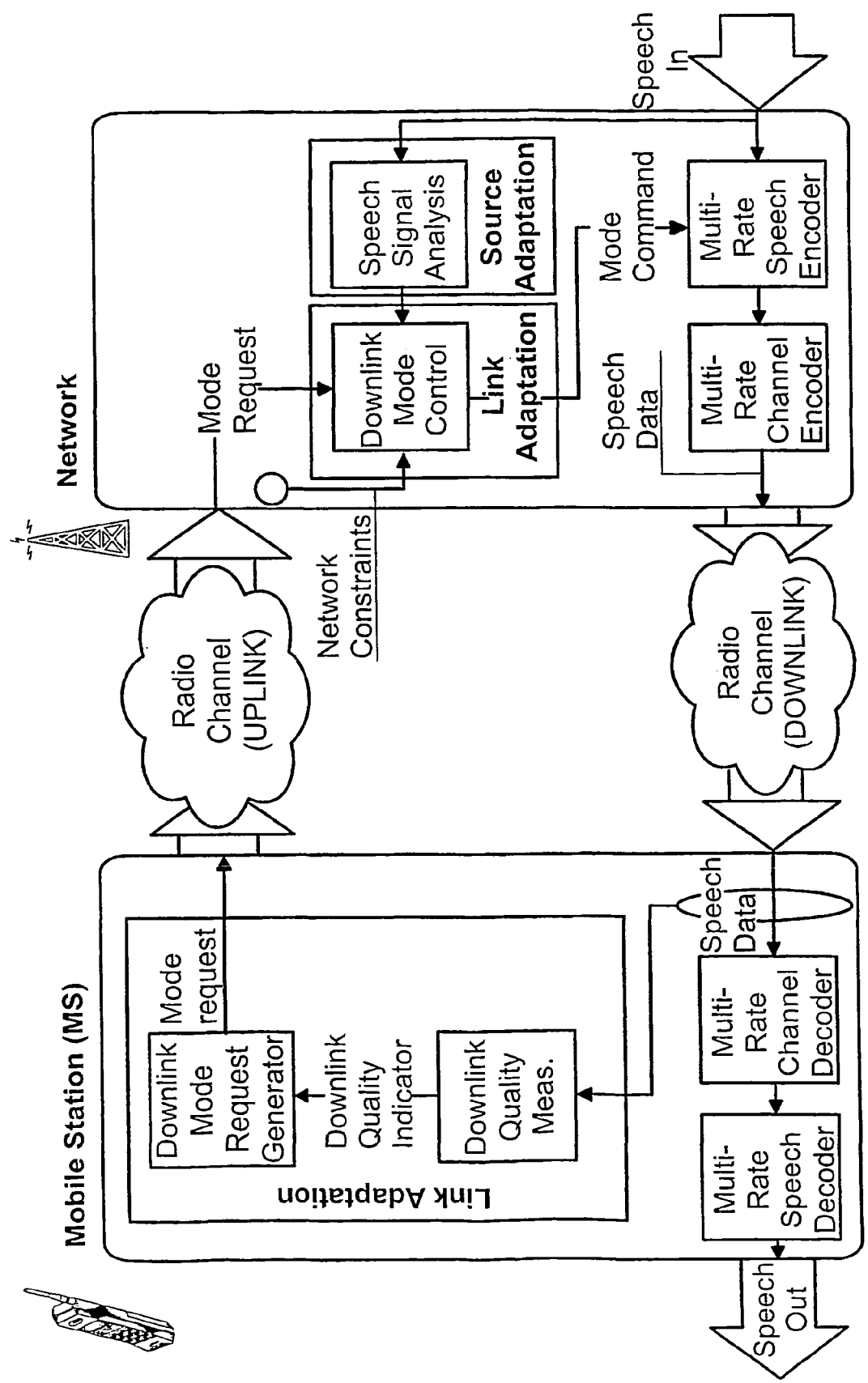
FIG. 3 shows a first embodiment of an implementation of the invention in a down-link path of a GSM system.

FIG. 3 shows a first embodiment of an implementation of the invention for providing down-link AMR control. It can be used in conjunction with the up-link AMR control arrangement described in relation to FIG. 2.

In a down-link direction, in the network an input signal is speech encoded in a multi-rate speech encoder, channel encoded in a multi-rate channel encoder and then transmitted across the air interface. In the MS the channel encoded signal is decoded in a multi-rate channel decoder and then speech decoded in a multi-rate speech decoder to provide a decoded speech signal.

In the MS, channel quality information is derived by estimating the current state of the down-link channel. The quality information is processed in a down-link quality estimation unit to produce a quality indicator. The quality indicator is used to generate a Mode Request $MR_d$ in a down-link Mode Request generator in a link adaptation block in the MS. The down-link Mode Request generator compares the quality indicator with certain thresholds to generate the Mode Request. The Mode Request indicates the preferred codec mode for the down-link. The Mode Request is transmitted in-band across the air interface to the network where it is fed into a down-link mode control unit.

In the network, at the input to the multi-rate speech encoder, a frame of the input signal is taken and it is fed into a source adaptation block where speech signal analysis is carried out to determine the characteristics of the input signal. This input signal may come from a fixed telephone network, from another cellular network or from another MSC of the same network. It is fed into the down-link mode control unit.

The down-link mode control unit receives a third input comprising network constraints. The down-link mode control unit takes the results of the speech signal analysis together with the channel quality from the down-link quality measurement unit and uses these inputs to make an optimised decision about which mode to use. This may involve changing the transmitted Mode Request so that it also uses the estimate of signal quality provided by the source adaptation block. The down-link mode control unit generates a Mode Command $MC_d$ indicating the codec mode to be used in the down-link path.

The channel quality measurement used is the same as those used in the down-link direction of a prior art system, such as the GSM AMR speech service using centralised control.

The down-link mode control unit usually grants the Mode Request. However, the Mode Request may be overridden depending on possible constraints from network control. The requested codec mode is then applied for encoding of the incoming speech signal in a way similar to that described above for the up-link channel.

Figure 4:
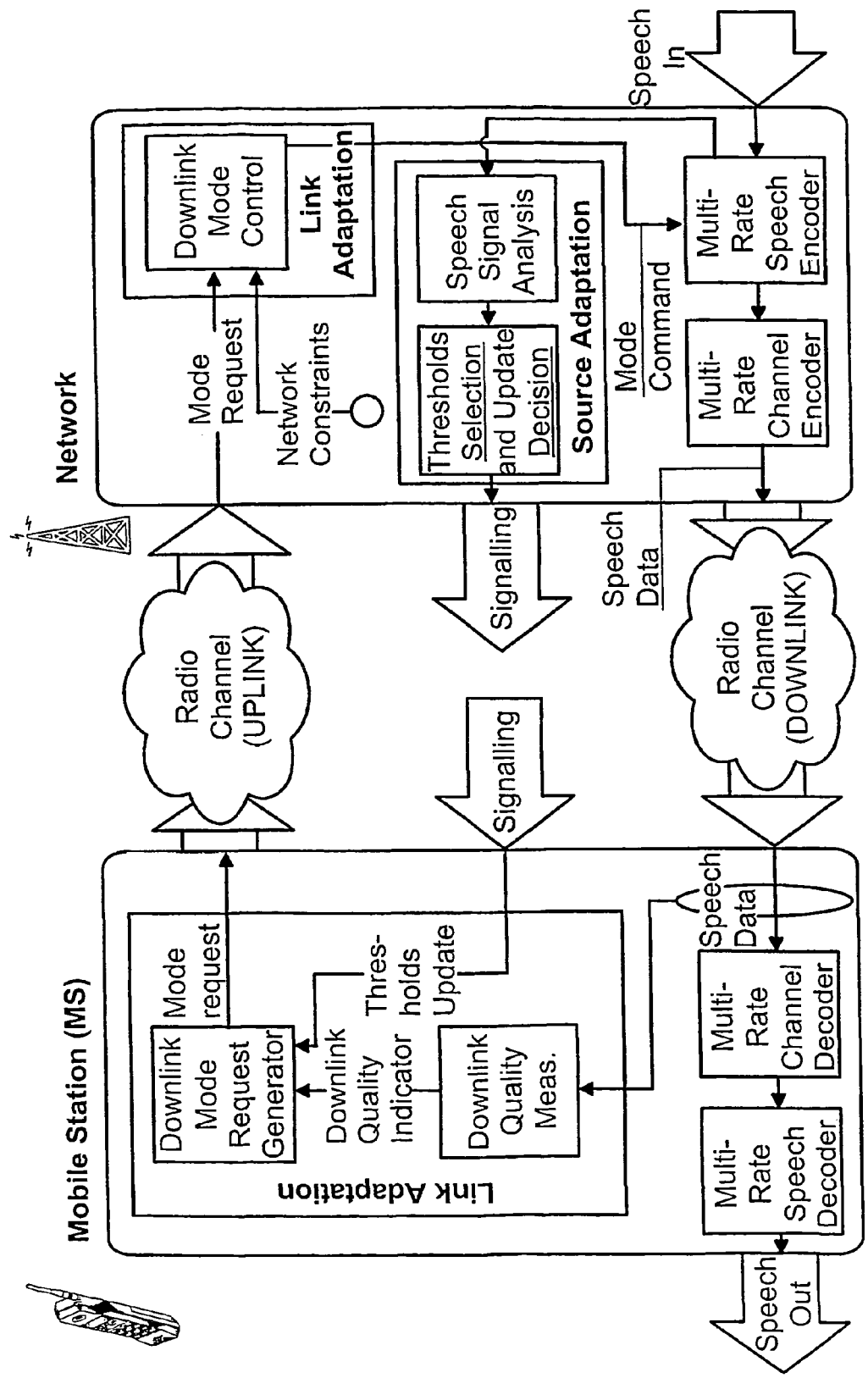
FIG. 4 shows a second, alternative, embodiment of an implementation of the invention in a down-link path of a GSM system.

FIG. 4 shows a second embodiment of an implementation of the invention for providing down-link AMR control. It can be used in conjunction with the up-link AMR control arrangement described in relation to FIG. 2.

The embodiment of FIG. 4 differs from that of FIG. 3 in the way in which source control is applied by the network to the MS. In the embodiment of FIG. 4, the output of speech signal analysis is not fed to the down-link mode control unit but instead it is used in a threshold selection and update decision module, where it updates the channel quality thresholds used by the MS. The channel quality thresholds, if modified, are sent to the MS using system signalling. Initial values are sent at the beginning of call establishment. The thresholds are then modified later, for example periodically and during hand-over. In an embodiment where the invention is applied to a GSM AMR system, this is layer 3 signalling.

In the MS, the threshold up-date is applied directly to the down-link mode request generator and is used, together with the channel quality indicator, to generate the Mode Request. This involves applying source-controlled adaptation to unquantised channel quality estimates to control Mode Request generation. One example of this adjustment is that when the speech signal contains background noise, the decision to switch from a higher bit rate codec to a lower bit rate codec is made using a lower channel quality-threshold than in the case when there is less background noise in the signal.

In the embodiment of FIG. 4, operation of the down-link mode control unit is compatible with operation of the GSM AMR specifications since the thresholds are sent to the mobile station using conventional signalling, for example layer 3 signalling. However, the thresholds used in the down-link Mode Request generator to generate the Mode Request (quantised channel quality) are changed to compensate for changes in the speech signal.

The embodiment of FIG. 3 has a faster adaptation to changes in source quality than that of FIG. 4. In the former case, the Mode Command is manipulated directly and the modified Mode Command can be transmitted rapidly to the MS. In the latter case, relatively slow layer 3 signalling is used to change the thresholds relating to the generation of a mode request in the MS. However, the implementation of FIG. 4 is more accurate because the unquantised channel measurements in the MS can be used and checked against the thresholds sent by layer 3 signalling. In the implementation of FIG. 3 quantised channel quality information (Mode Request from the MS) is used in the network.

According to the invention, it is possible to provide source-controlled adaptation in a system which utilises channel quality-controlled adaptation and to centralise control for both functions in the network. In particular, the invention may readily be applied to the GSM AMR speech service since no signalling changes are required within the network.

Although the invention is described with reference to a GSM AMR system, it may apply to any wireless telecommunications system in which channel quality-controlled adaptation is centralised in the network. Furthermore, it should be noted that the invention does not necessarily have to be applied to a system having channel quality-controlled adaptation. It can be used in any network where it is desired to implement centrally controlled source quality adaptation.

In the preceding description, the embodiments show network communicating with a single mobile station. Of course, the invention would be applied to a wireless telecommunications system in which a plurality of mobile stations communicate with a network.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method of controlling adaptive multi-rate speech coding in a wireless telecommunications system comprising a mobile station and a network, the method comprising: measuring channel quality of a link from the network to the mobile station; measuring speech characteristics of a signal which is to be transmitted from the network to the mobile station; forming a mode command on the basis of the channel quality and the speech characteristics; using the mode command to control the speech encoding bit rate of a multi-rate speech encoder located in the network.

2. The method according to claim 1, in which a measurement is made of speech characteristics of an input signal to a multi-rate speech encoder located in the network.

3. The method according to claim 2, in which a mode request is modified by the measurement of speech characteristics of the input signal to produce a down-link mode command.

4. The method according to claim 1, where the speech characteristics comprise an estimation of a background noise level of a speech signal.

5. The method according to claim 1, where the speech characteristics comprise a classification of whether a speech signal is voiced or unvoiced.

6. The method according to claim 5, where the classification of whether a speech signal is voiced or unvoiced is comprised of a consideration of a long term prediction lag parameter.

7. The method according to claim 5, where the classification of whether a speech signal is voiced or unvoiced is comprised of a consideration of a long term prediction gain parameter.

8. The method according to claim 5, where the classification of whether a speech signal is voiced or unvoiced is comprised of a consideration of linear predictive coding coefficients.

9. The method according to claim 1, where the wireless telecommunications system comprises a GSM system that uses AMR speech service.

10. A method of controlling adaptive multi-rate speech coding in a wireless telecommunications system comprising a mobile station and a network, the method comprising: measuring channel quality of a link from the network to the mobile station; measuring speech characteristics of a signal which is to be transmitted from the network to the mobile station; using the speech characteristics to up-date thresholds which are used to generate a mode request; forming a mode command on the basis of the channel quality and the thresholds; using the mode command to control the speech encoding bit rate of a multi-rate speech encoder located in the network.

11. A device comprising:

a wireless network interface for conducting bidirectional wireless communication with another device;

a multi-rate encoder to receive a speech signal;

an analyzer adapted to determine first information that comprises at least one characteristic of the speech signal which is to be transmitted to the another device; and a mode unit having an input coupled to an output of the analyzer and another input coupled to receive second information descriptive of at least one channel quality measurement, said mode unit adapted to produce mode-related information on the basis of at least the first and second information, the mode-related information being used to control a rate of the multi-rate speech encoder.

12. The device of claim 11, where the second information comprises an estimation of a background noise level of a speech signal.

13. The device of claim 11, where the first information comprises a classification of whether a speech signal is voiced or unvoiced.

14. The device of claim 13, where the classification of whether a speech signal is voiced or unvoiced is comprised of a consideration of at least one of a long term prediction lag parameter, a long term prediction gain parameter and linear predictive coding coefficients.

15. The device of claim 11, where the wireless network comprises an AMR speech service.

* * * * *

UNITED STATES PATENT AND TRADEMARK OFFICE
CERTIFICATE OF CORRECTION

| | | |
|---|---|---|
| PATENT NO. | : 7,315,814 B2 | Page 1 of 1 |
| APPLICATION NO. | : 10/311657 | |
| DATED | : January 1, 2008 | |
| INVENTOR(S) | : Vainio et al. | |

It is certified that error appears in the above-identified patent and that said Letters Patent is hereby corrected as shown below:

On the title page item (22), in the PCT information please delete "PCT Filed: Jun. 30, 2001" and insert -- PCT Filed: Jun. 13, 2001--.

Signed and Sealed this
Fifth Day of April, 2011

David J. Kappos
*Director of the United States Patent and Trademark Office*